Aug. 27, 1963 C. O. ROUNTREE, JR 3,101,836
CONVEYOR
Filed Nov. 9, 1961 5 Sheets-Sheet 4

INVENTOR
CLARENCE O. ROUNTREE, Jr.
By Donald G. Dalton
Attorney

United States Patent Office 3,101,836
Patented Aug. 27, 1963

3,101,836
CONVEYOR
Clarence O. Rountree, Jr., Oakland, Calif., assignor to United States Steel Corporation, a corporation of New Jersey
Filed Nov. 9, 1961, Ser. No. 151,290
19 Claims. (Cl. 198—162)

This invention relates to an endless conveyor for moving articles consecutively through processing apparatus and, more particularly, to conveyor apparatus especially adapted for use in paint spraying operations. In a manner to be described, it is directed to improvements that operate to move circular or cylindrical articles, such as drums, pails, other containers and container parts of circular shape, with a rotary spinning action that exposes all surface portions thereof to the spray from painting nozzles as they are moved through a paint spray booth.

Endless conveyors are commonly used in paint spraying operations, but are frequently subject to troublesome cleaning and painting problems that are caused by the devices for suspending or supporting the articles to be painted on the conveyor. In many instances the suspending or supporting devices lie in the path of the spray from the painting nozzles and either throw a shadow on the article in the form of unevenly painted surface areas or result in areas that are not painted. This problem is particularly troublesome when painting cylindrical containers and parts, or other circular objects even though the conveyor provides for rotation of the article as it moves through the paint spray booth. In addition, the necessity of removing paint from the article suspending or supporting devices before they can be used again requires continuous paint cleaning operations that are difficult to perform because of their complicated construction.

This invention accordingly has as its principal object the provision of an endless conveyor for continuously moving in consecutive order articles through a paint spray booth that eliminates the cleaning and painting problems customarily encountered in existing equipment for this purpose.

Another object of the invention is to provide a conveyor apparatus in the form of a pair of laterally spaced endless conveyor chains having parallel and horizontal upper runs with article supporting devices at spaced intervals along the length thereof for supporting articles in vertical positions over the space between said conveyor chains for movement over a horizontal path extending from one end to the other of said horizontal runs.

A related object is to provide in a conveyor of the character mentioned above a mechanism for rotating the article supporting devices as they move over the conveyor chain upper runs to rotate the article supported thereby about a vertically extending axis that is located centrally between said conveyor chains.

A further object is to provide a conveyor of the character mentioned above which is adjustable to enable handling of articles of different sizes. For this purpose, the invention contemplates an adjustable mounting for the conveyor chains that enables the lateral spacing therebetween to be varied in accordance with the diameter of the articles to be handled thereby.

A further object is to provide a conveyor according to the preceding objects in which only the article supporting devices are exposed to the paint spray in a painting booth and in which the remaining parts of the conveyor are protected by shields positioned between the conveyor and the paint spray nozzles.

Another object of the invention is to provide article supporting devices on the conveyor mentioned above in the form of dome-shaped caps rotatably mounted on spindles at spaced intervals along the length of the conveyor chains and in which the circular contour of the article supporting caps facilitates the removal of paint therefrom after their movement through a paint spray booth.

A still further object is to provide an auxiliary feed conveyor for delivering articles in sequential order to the above mentioned conveyor together with a drive for synchronizing the operation of both conveyors so that articles are fed consecutively to the supporting devices on the endless conveyor chains as they move into the horizontal upper runs thereof.

Other objects and advantages of the invention will become apparent from the following description.

In the drawings, there is shown a preferred embodiment of the invention. In this showing.

Figure 1:
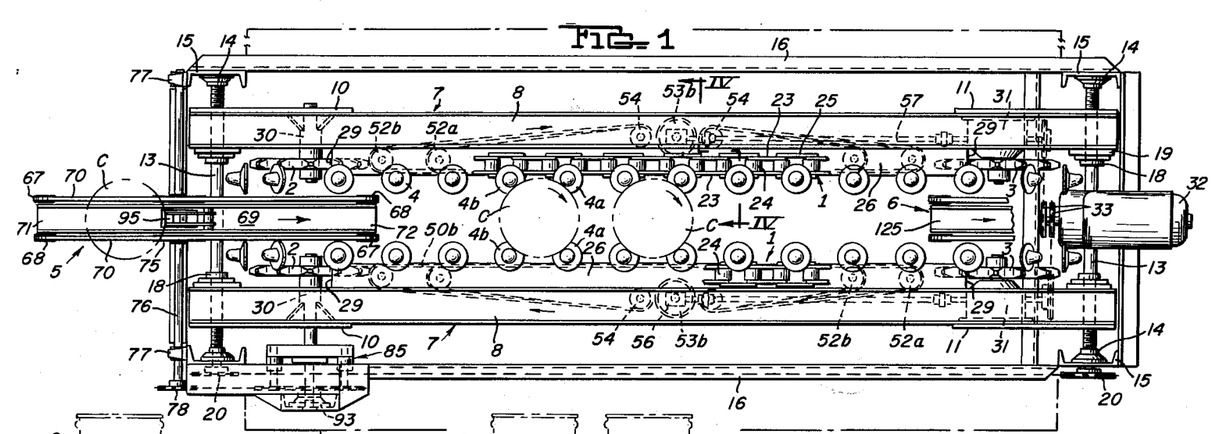
FIGURE 1 is a plan view of a conveyor constructed in accordance with the principles of this invention in which the conveyor chains thereof have been shown fragmentarily.
Figure 2:
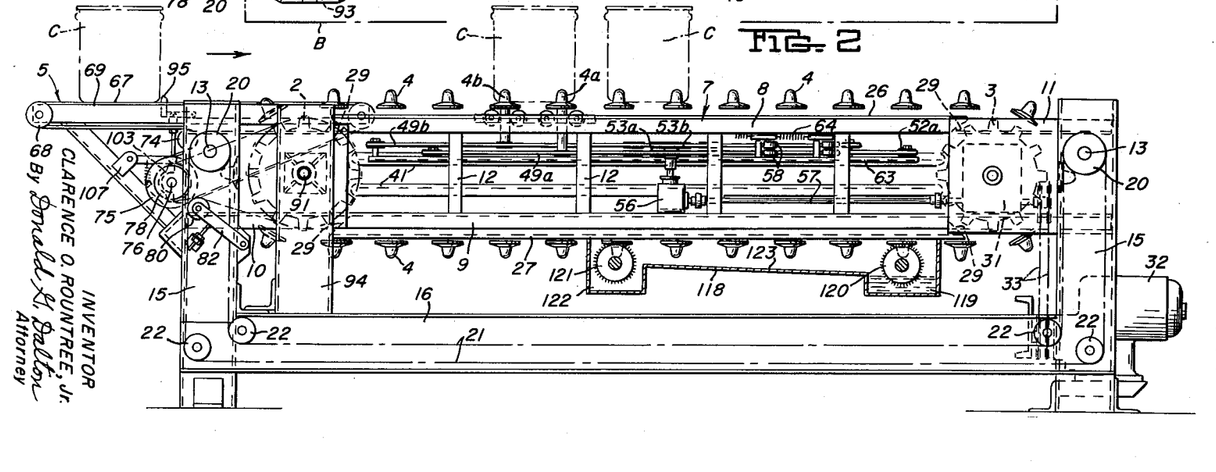
FIGURE 2 is an elevation of the apparatus shown in FIGURE 1 in which parts thereof have been broken away and other parts are shown fragmentarily.

As indicated above, the conveyor of this invention is especially designed for moving cylindrical or circular objects, such as the open-top cylindrical containers C shown in broken lines in FIGURES 1 and 2, from left to right through a spray painting booth or enclosure B, the contour of which is also illustrated in broken lines in FIGURE 1. This conveyor, generally stated, comprises a pair of laterally spaced endless conveyor chains 1 that are engaged over idler sprockets 2 and drive sprockets 3 arranged respectively at its entry and exit ends. Each of the chains 1 has article supporting members 4 rotatably mounted at uniformly spaced intervals along the length thereof. The supporting members 4 are preferably arranged on the chains 1 in groups of four or successive pairs of a leading member 4a and a trailing member 4b that are laterally aligned relative to each other. During movement over the horizontal upper runs of the chains 1 each group of laterally aligned pairs of members 4a and 4b have supporting engagement with the base of an article C at four circumferentially spaced points to support it in a vertical position over the space between the chains 1 for moving it from left to right as viewed in FIGURES 1 and 2. In a manner to be described, the members 4 are rotated during movement over the upper runs of the chains 1 to impart a rotary spinning movement to the containers C about a vertical axis located centrally between the chains 1 as they are moved through the paint booth B. Also in a manner to be described, an auxiliary endless feed conveyor 5 is operated in synchronism with the drive for the conveyor chains 1 to deliver the articles C to successive groups of the supporting members 4a and 4b as they move into the upper runs of the conveyor chains 1. As the articles C move to the end of the conveyor at the right of FIGURES 1 and 2, they are removed by an auxiliary endless discharge conveyor 6 which is shown fragmentarily in FIGURE 1.

Figures 3, 5:
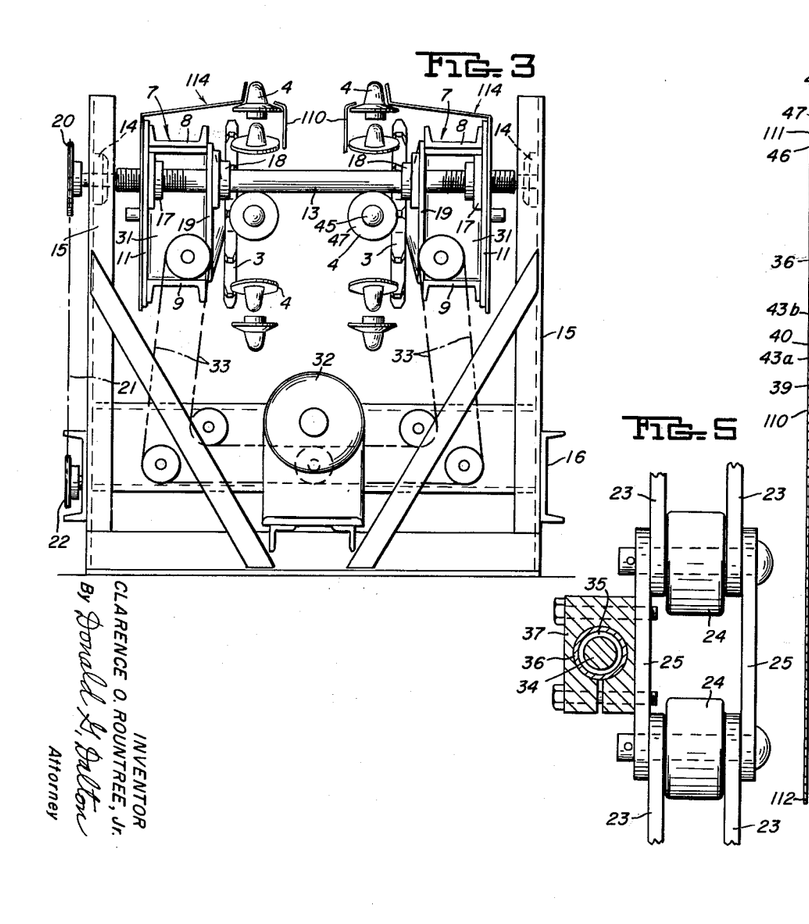
FIGURE 3 is an enlarged and somewhat fragmentary end view looking from the right of FIGURE 2.
FIGURE 5 is a sectional view taken substantially along the line V—V of FIGURE 4.
Figure 4:
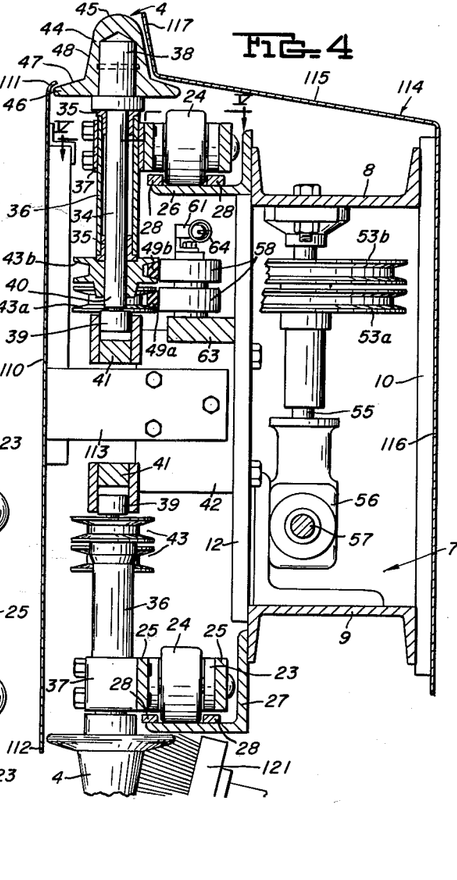
FIGURE 4 is an enlarged sectional view taken substantially along the line IV—IV of FIGURE 1.

For handling articles of different sizes, the mounting of the chains 1 provides for adjustment of their lateral spacing and thereby the lateral spacing of the members 4 according to the size of the article to be handled. This mounting comprises a pair of frames 7 each of which, as best shown in FIGURES 3 and 4, comprises upper and lower channels 8 and 9 that are held in vertically spaced relation by plates 10 and 11 at opposite ends thereof and by vertical bars 12 at spaced intervals along the length thereof, and a pair of shafts 13 extending transversely of the ends of the frames 7. Bearings 14 carried by vertical columns 15 forming a part of a supporting framework 16 for the apparatus provide a rotatable support for the ends of the shaft 13. The frames 7 are supported on the shafts 13 by threaded collars 17 secured to the vertical spacer plates 11 and slide collars 18 secured to spacer plates 19 extending between the upper and lower channels 8 and 9 on the facing portions of the frames 7. The collars 17 have threaded engagement with opposite ends of the shaft 13 while the collars 18 have a slide support on the central portion of the shafts 13. When the shafts 13 are rotated, the threaded collars 17 operate to move the frames toward or away from each other according to the direction of rotation of the shafts 13. The shafts are rotated simultaneously to adjust the lateral spacing of the frames 7 by a manually operable sprocket chain drive that includes sprocket wheels 20 keyed to each of the shafts 13 and a sprocket chain 21 trained over each sprocket wheel 20 and idler sprockets 22. When the conveyor is handling containers having a diameter as shown in FIGURE 1, the members 4a and 4b have engagement with its base at points spaced 90° apart, but this spacing will change when the frames 7 are moved toward each other for handling smaller articles, or away from each other for handling larger articles, which may be effected conveniently by manual operation of the chain 21 in either of opposite directions according to the required adjustment of the frames 7.

Each of the chains 1 comprises roller links 23 having rollers 24 at their ends and pivotal spacer links or bars 25 connecting adjacent links 23. During movement over the upper and lower runs of the chains 1, the rollers 24 are supported by angles 26 and 27 secured to the upper and lower frame channels 8 and 9. As shown in FIGURE 4, the rollers 24 have rolling engagement on the angles 26 and 27 and their movement thereover is guided by laterally spaced bars 28 secured to each of the angles 26 and 27. The angles 26 and 27 have a length such that their opposite ends 29 (FIGURE 2) are positioned respectively adjacent the sprocket wheels 2 and 3 and thus furnish a continuous support for the upper and lower runs of the chains 1 between the sprocket wheels 2 and 3.

The idler sprocket wheels 2 are supported on the frames 7 by bearing assemblies 30 mounted on the end plates 10, and the drive sprocket wheels 3 are supported on the frames 7 by worm-gear reducer-drive units 31 mounted on the end plates 11. The drive units 31 are driven at synchronous speeds by a variable-speed drive unit 32 through separate chain and sprocket drives 33 and thus operate the chains 1 at identical speeds to maintain the lateral alignment of the article supporting members 4 thereon.

The mounting for each of the supporting members 4 on the conveyor chains 1, as shown in FIGURE 4, comprises a spindle 34 rotatably supported by a bushing 35 in a sleeve 36 that is secured by a clamp 37 (see FIGURE 5) to a chain spacer link 25 at a point centrally thereof, there being a spindle 34 and supporting member 4 mounted on each of the links 25 along the facing side of the chains 1. By reason of this mounting, the axes of the spindles 34 on each chain lie in a common vertical plane and respectively extend transversely of the chain spacer links 25 and of the path of movement of the conveyor chains 1 in which they are connected. Each of the members 4 is secured to one end 38 of a spindle 34 for rotation therewith, and cam followers 39 are mounted on the other ends 40 of the spindles 34, the ends 38 and 40 being arranged outwardly and inwardly with respect to the path of movement of the chains 1. During movement over the upper and lower runs of the chains 1, the cam followers move through guide trackways 41 carried by bracket plates 42 suspended on the vertical frame spacer bars 12. The engagement of the cam followers 39 in the trackways 41 operates to hold the spindles 34 against lateral or wobbling movement about the trackway support of the rollers 24 on the angles 26 and 27 as they travel over the upper and lower runs of the chains 1. Rotation of the spindles 34 is effected by belt-driven pulleys 43 keyed on the inner ends 40 of the spindles 34. The pulleys 43 on the spindles 34 supporting the leading and trailing members 4a and 4b are respectively designated 43a and 43b and are located at vertically spaced levels for a purpose to be described.

Each of the supporting members 4 is in the form of a dome-shaped cap that comprises a circular central body portion 44 that is rounded at one end 45 and has a flange 46 projecting outwardly from its other end. During movement over the chain upper runs, the surfaces 47 of the flanges 46 face upwardly and have supporting engagement with the base of the articles C, and the outer surfaces 48 of the body portions 44, which have an upwardly diverging taper with respect to the flanges 46, act as abutments to hold the articles C against transverse movement with respect to their respective axes of rotation.

Figure 6:
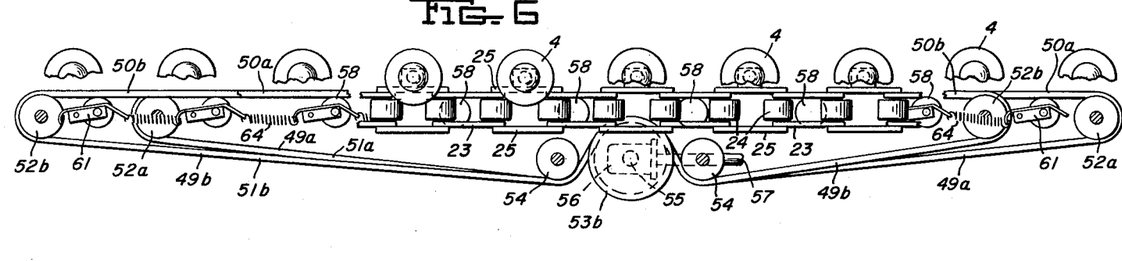
FIGURE 6 is a somewhat diagrammatic and fragmentary plan view of the endless belt drive for the drive pulleys on the conveyor chain spindles shown in FIGURES 2 and 4.
Figure 7:
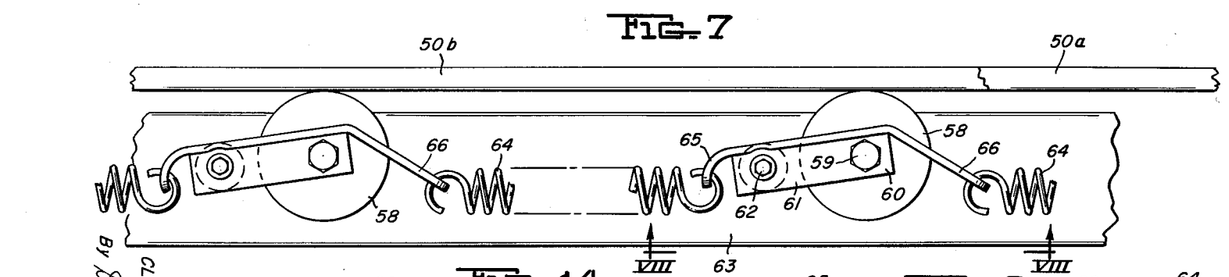
FIGURE 7 is an enlarged plan view showing the spring biased mounting of the belt drive traction rollers shown in FIGURE 6.
Figure 8:
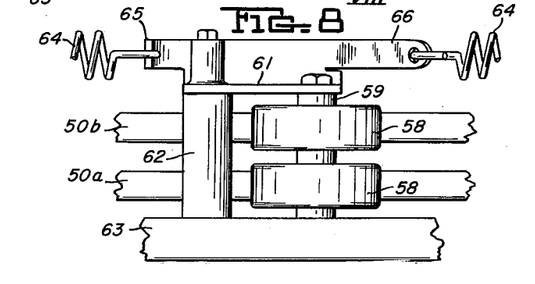
FIGURE 8 is an elevation thereof.

Rotation of the spindles 34 and the article supporting members 4 carried thereby is effected during their movement over the conveyor chain upper runs by a pair of vertically spaced endless V-belts 49a and 49b on each of the frames 7. The V-belts 49a and 49b respectively have inner runs 50a and 50b and outer runs 51a and 51b that extend between idler pulleys 52a and 52b at their respective ends as best shown in FIGURE 6. The inner runs 50a and 50b extend along paths respectively tangential to the spindle drive pulleys 43a and 43b so that they have driving engagement therewith during movement over the horizontal upper runs of the conveyor chains 1. In the mid-portion of their outer runs 51a and 51b, the belts are trained over vertically spaced drive pulleys 53a and 53b that are respectively positioned between separate pairs of guide pulleys 54 and are keyed on a common vertical drive shaft 55. Each shaft 55 is rotated by a right angle gear unit 56 that is driven by one of the gear reducers 31 through a horizontal drive shaft 57. The end pulleys 52a are spaced to the right of the pulleys 52b as viewed in the drawings so that the horizontal runs 50a of the belts 49a are spaced to the right of the horizontal belt runs 50b for a purpose to be described.

Driving engagement of the belts 49a and 49b with the spindle drive pulleys 43a and 43b is maintained by traction rollers 58 at spaced intervals along the length of each of the horizontal runs 50a and 50b thereof. As best shown in FIGURES 4 and 6 through 8, the rollers 58 are rotatably mounted on vertical shafts 59 that are supported on the outer ends 60 of brackets 61. The brackets 61 are rotatable about vertical pivots 62 that are supported on bars 63 attached to the frame vertical spacer bars 12. Spring 64 connected with lugs 65 and 66 projecting in opposite directions from the ends of the brackets 61 bias their rotational movement about their respective pivots 62 to engage the traction rollers with belt runs 50a and 50b and maintain them in driving engagement with the spindle drive pulleys 43a and 43b.

Figure 9:
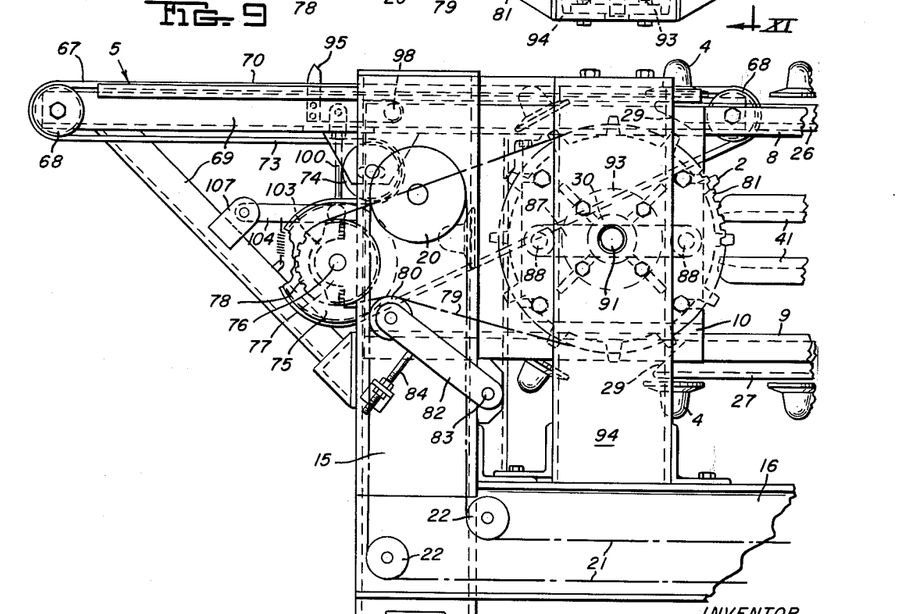
FIGURE 9 is an enlarged side elevation of the auxiliary feed conveyor which is shown on a smaller scale at the left of FIGURES 1 and 2.
Figure 10:
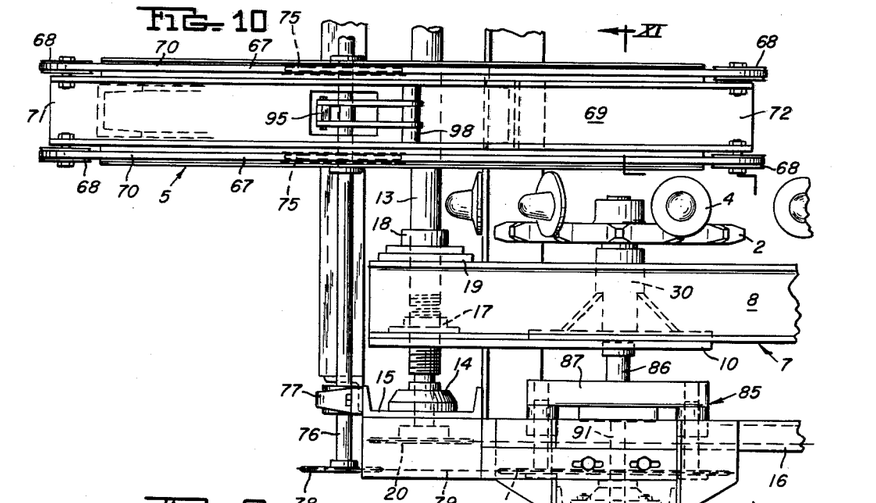
FIGURE 10 is a fragmentary plan view of the conveyor apparatus shown in FIGURE 9.
Figure 11:
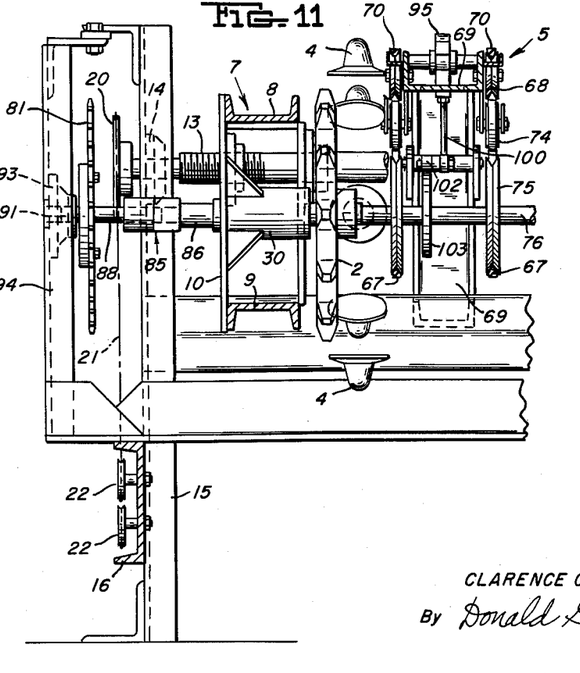
FIGURE 11 is a fragmentary end elevation looking from the right of FIGURE 10 in the direction of line XI—XI.

As mentioned above, the containers C are delivered to the conveyor chains 1 by an auxiliary feed conveyor 5. The conveyor 5 comprises a pair of laterally spaced endless conveyor belts 67 that are trained over idler pulleys 68, which are rotatably supported by a frame 69 carried by the supporting framework 16. The belts have parallel upper runs 70 that are horizontal and extend between the idler pulleys 68 at opposite ends 71 and 72 of the conveyor 5. The upper runs 70 operate to deliver articles C from the entry end 71 of the conveyor 5 to its discharge end 72, which as best shown in FIGURE 1 and for a purpose to be described, is arranged between the conveyor chains 1 at a point located inwardly with respect to the ends 29 of the angles 26 that define the beginning of the horizontal upper runs of the conveyor chains 1. The lower runs 73 of the belts 67 (FIGURES 9–11) are engaged over laterally spaced take-up pulleys 74 and drive pulleys 75. The pulleys 75 are keyed on a drive shaft 76 that is rotated continuously through a power take-off drive from one of the idler sprocket wheels 2 for the conveyor chains 1. The shaft 76 is rotatably supported by bearings 77 on the framework 16 and has a driven sprocket wheel 78 keyed to its outer end. The sprocket wheel 78 is operated by a chain sprocket 79, shown in broken lines in FIGURES 9 and 10, that is trained over an idler sprocket 80 and a drive sprocket 81. The idler sprocket 80 is a take-up sprocket and is rotatably supported on the outer end of a lever 82 that has a pivotal connection 83 at its other end with the supporting framework 16. The pivotal position of the lever 82 and thereby the position of the take-up sprocket 80 is controlled by adjusting the length of an adjusting rod 84. The sprocket wheel 81 is driven through a floating coupling 85 by one of the idler sprockets 2 and the shaft 86 with which it has a keyed connection.

Figure 14:
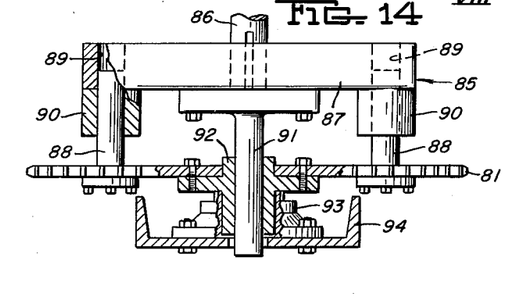
FIGURE 14 is a sectional view of a float coupling for driving the auxiliary feed conveyor.

As best shown in FIGURE 14, the floating coupling 85 comprises a drive bar 87 keyed on the outer end of the shaft 86 and a pair of axially extending driving lugs 88 that are secured to the sprocket 81 along a diameter thereof. The driving lugs 88 are slidable in axially extending openings 89 formed in the bar 87 and tubular extensions 90 welded thereto. The bar 87 has an extension 91 projecting axially from the center thereof that is rotatable and slidable in the hub 92 of the sprocket 81, the hub 92 being journalled in a bearing 93 carried by a vertical channel 94 that forms part of the supporting framework 16. When the main conveyor chain idler sprocket 2 keyed to the shaft 86 is rotated, the bar 87 operates through the driving lugs 88 to rotate the sprocket 81 and thereby the shaft 76 and the drive pulleys 75 thereon for the auxiliary conveyor belts 67. The axial sliding movement of the extension 91 in the sprocket hub 92 and of the driving lugs 88 in the openings 89 provides for axial movement of the bar 87 with lateral adjusting movement of the frame 7 carrying the bearing 30 through which the shaft 86 extends without interruption of the driving connection of the bar 87 with the sprocket-chain drive 79 for the auxiliary conveyor 5.

Figure 12:
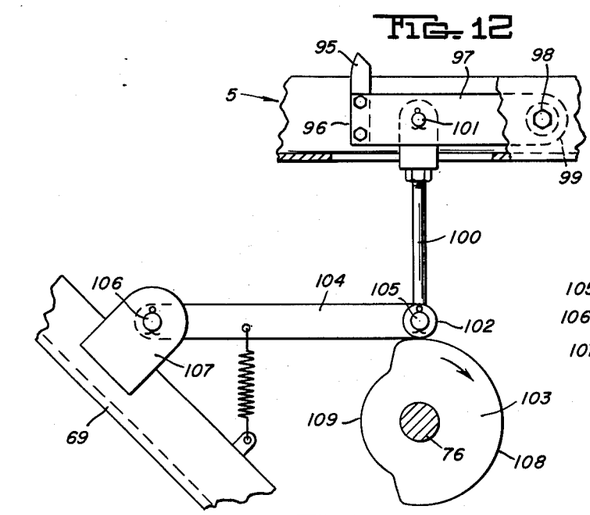
FIGURE 12 is a side elevation of the stop dog for controlling movement of articles over the auxiliary conveyor shown in FIGURES 9-11 and of the cam operating mechanism therefor.
Figure 13:
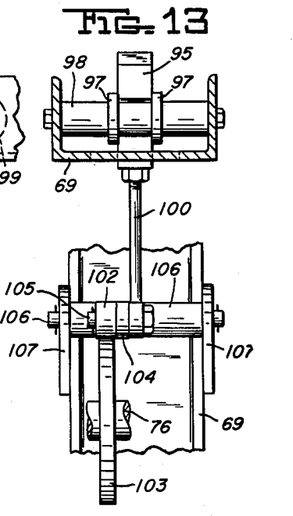
FIGURE 13 is an end view looking from the right of FIGURE 12.

The article delivery operation of the auxiliary feed conveyor 5 is synchronized with the operation of the main conveyor chains 1 to deliver an article thereto as each group of laterally aligned pairs of article supporting members 4a and 4b moves into the upper runs of the conveyor chains 1. This synchronizing operation is effected by a stop 95 that is positioned between the auxiliary feed conveyor belts 67 and normally occupies a position in which it extends above the level of the upper runs 70 in which it stops the movement of the articles C in the position shown at the left of FIGURES 1 and 2. As each group of supporting members 4a and 4b moves into their article receiving positions in a manner to be described, the stop 95 is lowered to release one of the articles C for movement to the discharge end 72 of the auxiliary conveyor 5. As best shown in FIGURES 12 and 13, the stop 95 is supported between the outer ends 96 of a pair of links 97 that have a pivotal connection 98 at their other ends 99 on the supporting frame 69 for the conveyor 5. Pivotal movement of the links 97 to move the stop 95 to and from its upper position in which it extends above the belt upper runs 70 and is in the path of movement of articles C thereover is controlled by a vertically extending cam actuated operating link 100 that has a pivotal connection 101 at its upper end and a cam follower roll 102 at its lower end. The roller 102 has rolling engagement with the periphery of a cam 103 that is keyed or otherwise secured to the drive shaft 76 for the conveyor belt drive pulleys 75 and for rotation therewith. A cam follower arm 104 has a pivotal connection at one end with a shaft 105 which supports the roller 102 on the lower end of the link 100. A pivot 106 connects the other end of the follower arm 104 with a lug 107 secured to the auxiliary conveyor frame 69. The periphery of the cam 103 has camming surfaces 108 and 109 that have different radial spacings with respect to the shaft 76 for a purpose to be described. The cam 103 rotates in a clock-wise direction as viewed in FIGURE 12 when the conveyors are operating. While the cam follower roll 102 is engaged with the camming surface 108, the link 100 operates to hold the stop 95 in its upper position arresting the movement of articles over the conveyor 5. As the roller 102 moves from the surface 108 onto the camming surface 109, the link 100 drops downwardly and the stop 95 is moved out of its article arresting position to release an article C for movement by the auxiliary conveyor upper runs 70 to the discharge end 72 of the conveyor 5. The cam 103 has an angular position on the drive shaft 76 such that this action takes place in a manner to be explained as each laterally aligned pair of leading article supporting members 4a moves upwardly over the idler sprockets 2 and into the horizontal upper runs of the conveyor chains 1.

As will be apparent from the above, the mounting for the article supporting members 4 that is provided by the specific arrangement of the spindles 34 at spaced intervals along the chains 1 places the article supporting members 4a and 4b at a level above the chains 1 and along the facing sides thereof when they travel from left to right over the upper runs thereof. By reason of this arrangement, there are no obstructions in the space between and over the chains 1 through which the articles C are carried by the supporting members 4a and 4b. Paint spray nozzles may thus be mounted in positions above and below the path of movement of the articles C as well as along opposite sides thereof as it is moved over the upper runs of the conveyor chains 1. All external surfaces of the articles moving through the apparatus, and the internal surfaces of open-top containers are thus exposed directly to the spray from the painting nozzles. Since the supporting members 4 are located below and at one side of the articles C being painted, they are not in the direct path of the spray from the painting nozzles, and no bare or thinly painted spots are left by fixture shading as frequently experienced in existing paint spraying equipment. This is extremely important in the application of coatings and linings to the internal surfaces of open-top containers.

By reason of the fact that the conveyor chains 1 are located at opposite sides of and below the path of movement of the articles C and are independently supported on separate frames 7, the operating parts of the conveyor mechanism can be protected effectively by shields against paint being sprayed from painting nozzles in the booth B. As shown only in FIGURE 4, the facing sides of the chains 1 are protected by a vertical shield 110 that has an inturned lip 111 along its upper edge that extends inwardly over the outer edges of article supporting surfaces 47 on the members 4 as they travel over the conveyor chain upper runs and a lower edge 112 that is positioned below the flanges 46 on the members 4 travelling over the conveyor chain lower runs. The shields 110 are secured to the frames 7 by brackets 113 that have supporting connections on the vertical spacer bars 12 extending between the upper and lower frame channels 8 and 9. The area over the conveyor chains 1 and outwardly with respect to the supporting frame 7 is protected by a shield 114 that has a top portion 115 extending inwardly over the frame 7 and conveyor chain 1 and upwardly over a portion of the supporting members 4 and a vertical portion 116 that extends downwardly over the outer edges of the frame channels 8 and 9. While the shields 110 and 114 have been omitted from the showing in FIGURES 1 and 2, the shield 114 has a length such that it extends between the frame end plates 10 and 11 to which it is secured, and shield 110 has a length corresponding to the length of the upper runs of the chains 1 between the ends 29 of the conveyor chain supporting flanges 26 and 27. The only portion of the conveyor apparatus that is exposed to the paint spray is the small area of each supporting members 4 between the upper edge 117 of the shield 114 and the inturned lip 111 on the inner shield 110, which is partially protected by the articles supported thereby during movement through the paint booth B.

Cleaning of the supporting members 4 is effected conveniently by moving them through a trough 118 (FIGURE 2) during the return movement of the lower runs of the conveyor chains 1. The trough 118, as shown diagrammatically in FIGURE 2, has a sump 119 at one end thereof for solvent or paint washing fluid and a rotary brush 120 for cleaning paint from the supporting members 4 as they move thereby. A rotary brush 121 is provided in a chamber 122 at the other end of the trough 118 for drying the supporting members 4 as they move thereby. The center portion 123 of the trough 118 is downwardly inclined toward the sump 119 for returning washing fluid thereto that drips from the supporting members 4 as they travel away from the cleaning brushes 120.

To condition the apparatus for operation, the lateral spacing of the frames 7 is adjusted to position the article supporting members 4 according to the size of the articles C to be supported thereby. This adjustment is made so that the distance between diametrically opposed supporting members 4a and 4b in each group of laterally aligned pairs of supporting members 4 corresponds to the diameter of the base of the article to be supported on the surfaces 47 of their respective flanges 46. After this adjustment is made, the conveyor chains 1 and the conveyor 5 are placed in operation by actuating the drive 32. The articles C are fed continuously to the auxiliary feed conveyor by a conventional conveyor (not shown) positioned at the left of the feed conveyor 5 as viewed in FIGURE 1. As explained above, the stop 95 normally acts to interrupt movement of articles over the auxiliary conveyor 5, but is lowered to release an article C for movement by the conveyor chain 5 to conveyor chains 1 as each group of supporting members 4 move into the upper runs of the chains 1. This action takes place, more particularly, as each laterally aligned pair of leading supporting members 4a move into the chain conveyor upper run and before a laterally aligned pair of trailing supporting members 4b move to a vertical level at which they would interfere with the movement of the article by the conveyor 5. For this purpose, the synchronizing cam 103 as mentioned above is positioned on the drive shaft 76 for the auxiliary conveyor 5 in an angular position such that the cam follower 102 moves from the cam surface 108 to the cam surface 109 to lower the article stop 95 and release an article for movement to the discharge end 72 of the conveyor 5 just as each laterally aligned pair of supporting members 4a moves upwardly over the idler sprockets 2 to a vertical level above the horizontal runs 70 of the auxiliary conveyor belts 67. The article that is released by the stop 95 then travels to the right until its base engages the center portions 44 of the pair of leading supporting members 4a that are just moving into an article supporting position at the beginning of the upper runs of the conveyor chains 1. As the leading pair of supporting members 4a continues to move to the right into the conveyor chain upper runs, the auxiliary conveyor belt upper runs 70 continue to move the article to the right and maintain it engaged with a pair of leading supporting members 4a. This movement continues until the trailing supporting members 4b move upwardly under the article being held by the conveyor 5 against the leading pair of supporting members 4a and, at this point, the article is transferred to the flanges 47 on the group of members 4a and 4b that are just moving into the conveyor chain upper runs for movement thereby through the spray booth B.

It will be recalled that the drive belts 49a for rotating the leading supporting members 4a are spaced to the right as viewed in FIGURES 1 and 2 with respect to the drive belts 49b for rotating the trailing supporting members 4b. This spacing of the drive belts 49a and 49b is made approximately equal to the spacing between the supporting members 4 along the length of the chains 1 so that rotation of the leading supporting members 4a and the trailing supporting members 4b is started and stopped simultaneously at both ends of the conveyor chain upper runs. As the supporting members travel to the right over the conveyor chain upper runs, the drive belts 49a and 49b are driven by the pulleys 53a and 53b in the direction indicated by arrows in FIGURE 1 and operate through the pulleys 43a and 43b to rotate the supporting members 4a and 4b in a counter clock-wise direction as viewed in FIGURE 1. The belt drive pulleys 53 on the two frames 7 have different diameters so that the members 4 will all be driven at the same speed. This rotational movement of the supporting members 4 operates to rotate the articles C in a clock-wise direction about a central and vertical axis positioned midway between the chains 1 as they are moved through the paint spray booth B, so that all portions of their surfaces are exposed to spray from the paint nozzles therein. As the articles move through the apparatus with a rotary spinning action in this manner, they are supported on the flange surfaces 47 of the supporting members 4 and their center body portions 44 act as stops or abutments to limit lateral movement of the articles C on the flanges 47.

When the supporting members 4 move to the end of the conveyor chain upper runs and start their travel downwardly over the drive sprockets 3, the articles are deposited on the forward end 125 of the discharge conveyor 6 for removal from the painting apparatus. The discharge conveyor 6 is constructed similarly to the conveyor 5, but is not provided with the article stop 95 or the synchronizing drive that is required in the auxiliary feed conveyor 5.

While one embodiment of my invention has been shown and described it will be apparent that other adaptations and modifications may be made without departing from the scope of the following claims.

I claim:

1. A conveyor for moving articles with a rotary motion through a processing apparatus comprising, a pair of laterally spaced endless conveyors having upper runs that are parallel, drive means for operating said conveyors at identical speeds, a plurality of article supporting members at spaced intervals along the length of each of said conveyors, means mounting said members on said conveyors for movement therewith and for rotational movement relative thereto, said supporting members being arranged on said conveyors in successive groups respectively adapted during movement over said conveyor upper runs to have supporting engagement at circumferentially spaced points with the base of an article to support it in a vertical position over the space between said conveyors, and means for rotating at least one of the supporting members in each of said groups during movement over the said conveyor upper runs to rotate an article supported thereby about a vertical axis extending centrally thereof.

2. A conveyor apparatus as defined in claim 1 characterized by each of said groups comprising laterally aligned pairs of said supporting members for supporting engagement with the base of an article at four circumferentially spaced points.

3. A conveyor apparatus as defined in claim 2 characterized by said points of circumferential supporting engagement being spaced 90° apart.

4. A conveyor apparatus as defined in claim 1 characterized by each of said supporting members comprising a body portion of circular contour arranged concentrically of its axis of rotation and an annular flange projecting outwardly from said body portion, the said flanges on the said supporting members in each of said groups cooperating to furnish a support for an article and the said body portions cooperating to hold an article supported on said flanges against lateral and longitudinal motion relative to said conveyors.

5. A conveyor apparatus as defined in claim 1 characterized by separate means supporting each of said conveyors for movement toward and away from each other, and means for adjusting the positions of said conveyors on said supporting means to vary the lateral spacing of the article supporting members in each of said groups according to the size of the article to be supported thereby.

6. A conveyor for moving articles with a rotary motion through a processing apparatus comprising, a pair of laterally spaced endless conveyors having upper runs that are parallel, drive means for operating said conveyors at identical speeds, a plurality of articles supporting members at spaced intervals along the length of each of said conveyors, means mounting said members on said conveyors for movement therewith and for rotational movement relative thereto, said supporting members being arranged on said conveyors in successive groups respectively adapted during movement over said conveyor upper runs to have supporting engagement at circumferentially spaced points with the base of an article to support it in a vertical position over the space between said conveyors, means for rotating said supporting members during movement over said conveyor upper runs to rotate an article supported thereby about a vertical axis centrally located between said conveyors, and means for consecutively placing articles in supported positions on successive groups of said supporting members at one end of said conveyors for movement thereby over the said upper runs thereof.

7. A conveyor apparatus as defined in claim 6 characterized by said last-named means comprising an auxiliary conveyor for delivering the said articles to the said one end of said conveyors, and means for synchronizing the article delivery operation of said auxiliary conveyor with the drive means for said pair of conveyors.

8. A conveyor apparatus as defined in claim 7 characterized by said synchronizing means comprising a stop for arresting the delivery of articles by said auxiliary conveyor, and means including a cam operated by said drive means for operating said stop to release an article for movement to said pair of conveyors when the said supporting members in each of said groups move into said conveyor upper runs.

9. A conveyor for delivering articles with a rotary motion through a processing apparatus comprising, a pair of laterally spaced endless conveyor chains respectively having horizontal upper runs that are parallel, a plurality of article supporting members at uniformly spaced intervals along the length of each of said conveyor chains and mounted thereon for movement therewith and for rotational movement about axes extending transversely of said chains and lying in a vertical plane, said members being arranged on said conveyor chains in successive pairs aligned laterally relatively to each other for supporting engagement with the base of an article at four circumferentially spaced points, drive means for operating said conveyor chains at synchronous speeds, feed means for consecutively depositing articles to be conveyed on successive laterally aligned pairs of said supporting members at one end of said conveyor chains, and means for rotating said supporting members during movement over said conveyor chain upper runs to rotate an article supported thereby about a vertical axis positioned centrally between said conveyor chains.

10. A conveyor for moving articles with a rotary motion through a processing apparatus comprising, a pair of laterally spaced conveyor chains respectively having upper runs that are parallel, drive means for operating said conveyor chains at identical speeds, a plurality of spindles at spaced intervals along the length of each of said chains and mounted thereon for rotation about axes extending transversely thereof, each of said spindles having outer and inner ends respectively positioned outwardly and inwardly with respect to the conveyor chain on which it is mounted, article supporting members mounted on said spindle outer ends, drive pulleys mounted on said spindle inner ends, said spindles being arranged on said conveyor chains in successive pairs aligned laterally relative to each other with the supporting members thereon adapted during movement over said upper runs to have supporting engagement with the base of an article at four circumferentially spaced points, and means for rotating said spindles comprising an endless belt having a horizontal run for driving engagement with said drive pulleys during movement over said conveyor chain upper runs, and drive means for operating said belt to rotate said pulleys and thereby said spindles and the article supporting members thereon.

11. A conveyor for moving articles with a rotary motion through a processing apparatus comprising, a pair of laterally spaced conveyor chains respectively having upper runs that are parallel, drive means for operating said conveyor chains at identical speeds, a plurality of spindles at spaced intervals along the length of each of said chains and mounted thereon for rotation about axes extending transversely thereof, each of said spindles having outer and inner ends respectively positioned outwardly and inwardly with respect to the conveyor chain on which it is mounted, article supporting members mounted on said spindle outer ends, drive pulleys mounted on said spindle inner ends, said spindles being laterally aligned on said conveyor chains in successive leading and trailing pairs with the said supporting members thereon adapted during movement over said conveyor chain upper runs to have supporting engagement with the base of an article at four circumferentially spaced points, the said drive pulleys on said leading spindles being axially spaced relative to the said drive pulleys on said trailing spindles, and means for rotating said spindles comprising a pair of endless belts having horizontal runs spaced vertically apart a distance corresponding to the axial spacing of said pulleys on said trailing and leading spindles respectively for driving engagement with said trailing and leading spindle drive pulleys during movement over said conveyor chain upper runs, and drive means for operating said belts to rotate said pulleys and thereby said spindles and the article supporting members thereon.

12. A conveyor apparatus as defined in claim 11 characterized by the said horizontal runs of said spindle pulley drive belts being spaced relative to each other along the length of said conveyor chain upper runs to provide for simultaneously starting and stopping the rotation of said leading and trailing spindles in each of said successive pairs at opposite ends of their travel over said conveyor chain upper runs.

13. In a conveyor for delivering articles with a rotary motion through a processing apparatus, a pair of laterally spaced horizontal frames, a support on which said frames are mounted for movement toward and away from each other, a pair of laterally spaced conveyor chains respectively having horizontal upper runs that are parallel, separate means including a mechanical operating drive mounting said conveyor chains on said frames, a plurality of article supporting members at uniformly spaced intervals along the length of each of said conveyor chains and mounted thereon for movement therewith and for rotational movement about axes extending transversely of said chains and lying in a vertical plane, said members being laterally aligned on said conveyor chains in successive pairs for supporting engagement with the base of an article at four circumferentially spaced points, means responsive to movement of said supporting members along the said horizontal upper runs for rotating at least one of said supporting members to rotate an article supported thereby, and means for adjusting the positions of said frames on said support to adjust the lateral spacing of said supporting members according to the size of the article to be supported thereby.

14. In a conveyor for delivering articles with a rotary motion through a processing apparatus, a pair of laterally spaced endless conveyor chains respectively having horizontal upper runs that are parallel, a plurality of article supporting members at uniformly spaced intervals along the length of each of said conveyor chains and mounted thereon for movement therewith and for rotational movement about axes extending transversely of said chains and lying in a vertical plane, said supporting members being laterally aligned on said conveyor chains in successive groups of leading and trailing pairs for supporting engagement with the base of an article at four circumferentially spaced points, drive means for operating said conveyor chains at identical speeds to move said supporting members over a horizontal path extending from one end to the other of said horizontal upper runs, an article feeding means comprising an endless auxiliary feed conveyor having a horizontal upper run with the discharge end thereof positioned between said conveyor chains at the said one end of said horizontal upper runs thereof, means for operating said auxiliary conveyor to deliver articles consecutively to a pick-up position at its said discharge end for engagement by said successive groups of leading and trailing supporting members as they move into said conveyor chain horizontal upper runs for movement thereby over said horizontal path, and means for rotating at least one of the supporting members in each of said successive groups during movement over said horizontal path to rotate the article supported thereby.

15. A conveyor apparatus as defined in claim 14 characterized by means for synchronizing said auxiliary conveyor operating means and said conveyor chain drive means to deliver articles consecutively to said pick-up position as each laterally aligned pair of said leading supporting members in said successive groups moves into the said upper runs of said conveyor chains.

16. A conveyor apparatus as defined in claim 15 characterized by said synchronizing means comprising a stop for arresting the delivery of articles by said auxiliary conveyor, and means operated by said conveyor chain drive means for consecutively actuating said stop to release an article for movement by said auxiliary conveyor to said pick-up position at its said discharge end.

17. A conveyor apparatus as defined in claim 14 characterized by each of said supporting members comprising a body portion of circular contour arranged concentrically of its axis of rotation and an annular flange projecting outwardly from said body portion, the said flanges on the said supporting members in each of said groups cooperating to furnish a support for an article and their said body portions cooperating to hold said article supported on said flanges against lateral movement relative to said conveyors.

18. A conveyor apparatus as defined in claim 14 in which the said supporting member flanges travel over said horizontal path during movement over the said upper runs of said conveyor chains, and by the said horizontal upper run of said auxiliary feed conveyor being located at a vertical level with respect to the said horizontal path such that said supporting member flanges receive the articles from said auxiliary conveyor as they move into said conveyor chain upper runs, the said supporting member body portions on said laterally aligned pairs of leading supporting members acting as abutments that control the forward movement of an article by said auxiliary conveyor during the period between its engagement by a pair of said flanges on a pair of said leading supporting members and its engagement by a pair of flanges on a following pair of trailing supporting members.

19. A conveyor for moving cylindrical articles successively through paint spraying apparatus comprising, a pair of laterally spaced endless conveyor chains respectively having horizontal upper and lower runs that are parallel, drive means for operating said conveyor chains at synchronous speeds, a plurality of article supporting members at spaced intervals along the length of each of said conveyor chains, means mounting said members on said conveyor chains for movement therewith and for rotational movement relative thereto, said supporting members being arranged on said conveyor chains in successive groups respectively adapted during movement over said conveyor chain upper runs to have supporting engagement at circumferentially spaced points with the base of an article to support it in a vertical position over the space between said conveyor chains, means for rotating said supporting members during movement over said conveyor chain upper runs to rotate an article supported thereby about a vertical axis centrally located between said conveyor chains, and means for cleaning said article supporting members comprising a trough through which said article supporting members travel during movement over said conveyor chain lower runs, and rotatable brushes in the path of movement of said supporting members through said trough for removing paint therefrom.

References Cited in the file of this patent

UNITED STATES PATENTS

| 2,873,842 | Erickson | Feb. 17, 1959 |
| 2,880,850 | Keathley | Apr. 7, 1959 |